United States Patent [19]
Stange et al.

[11] 3,781,186
[45] Dec. 25, 1973

[54] LAMINATES OF STYRENE POLYMERS AND POLYPHENYLENE OXIDE

[75] Inventors: Karl Stange, Hambach; Helmut Jenne, Schriesheim; Ulrich Koenig, Ludwigshafen, all of Germany

[73] Assignee: Badische Anilin- & Soda-Fabrik Aktiengesellschaft, Ludwigshafen/Rhine, Germany

[22] Filed: Mar. 27, 1972

[21] Appl. No.: 238,639

[52] U.S. Cl............... 161/253, 161/255, 260/47 ET
[51] Int. Cl. ........................ B32b 27/08, C08f 31/00
[58] Field of Search............................ 161/253, 255; 260/47 ET

[56] References Cited
UNITED STATES PATENTS

| | | | |
|---|---|---|---|
| 3,438,845 | 4/1969 | Cohen et al. | 161/253 X |
| 3,424,649 | 1/1969 | Nyberg et al. | 161/253 |
| 3,645,838 | 2/1972 | Newman et al. | 161/255 X |
| 3,380,880 | 4/1968 | Wheeler | 260/47 ET X |

*Primary Examiner*—George F. Lesmes
*Assistant Examiner*—Patricia C. Ives
*Attorney*—Johnston, Root, O'Keeffe, Keil, Thompson & Shurtleff

[57] ABSTRACT

Laminates of polyphenylene oxide as layer A and a styrene polymer as layer B. Layer A contains more than 20 percent of polyphenylene oxide; layer B is a styrene polymer containing more than 40 percent of polymerized units of styrene. The laminates may be used in the manufacture of film or sheeting, e.g. for packaging purposes.

5 Claims, No Drawings

LAMINATES OF STYRENE POLYMERS AND POLYPHENYLENE OXIDE

This invention relates to laminates consisting of polyphenylene oxide as layer A and a styrene polymer as layer B.

Polyphenylene oxide is a stiff, strong and also very tough material having a natural beige color. When tested according to ASTM D 635-63, polyphenylene oxide is self-extinguishing without drop formation. Its modulus of elasticity is almost constant up to about 190°C. One would thus have expected it to have a long-term thermal stability up to about 150°C. It has been found, however, that polyphenylene oxide is very light-sensitive and subject to oxidation. Its long-term thermal stability is therefore below 100°C as measured by German Standard Specification DIN 53,446 (see E. Behr, Hochtemperaturbestandige Kunststoffe, published by Karl Hanser Verlag, Munich, 1969, pp. 55/56).

Styrene polymers are very stiff and each of said styrene polymers is readily heat-sealable with itself and usually with the other polymers in this group. Impact-resistant blends are also tough. However, they show long-term thermal stability at only relatively low temperatures of from 65° to 85°C; only copolymers of styrene and α-methylstyrene show thermal stabilities up to about 110°C.

Both styrene polymers and polyphenylene oxide may be readily processed by injection molding or extrusion, although polyphenylene oxide requires higher processing temperatures. As they are compatible with each other, attempts have already been made to produce compound systems by mixing impact-resistant polystyrene with polyphenylene oxide in order to combine the desirable properties of these two materials. It has been found, however, that there is merely substantial summation of the mechanical properties of the starting materials. The light-sensitivity and oxidizability of the component polyphenylene oxide are not improved and the mixtures are not so readily heat-sealed as styrene polymers.

We have now found that a composite system of polyphenylene oxide and styrene polymers, in which the highly desirable properties of the individual components are retained in a favorable combination, may be produced by bringing the starting materials together in the form of layers forming sequences appropriate to the use to which the resulting laminates are to be put.

The present invention thus relates to laminates consisting of at least one layer A and one layer B, layer A containing more than 20% by weight of a polyphenylene oxide of the general formula:

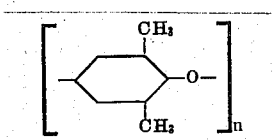

in which n is from approximately 10³ to about 10⁴, and layer B constituting a styrene polymer which may or may not have been modified to improve its impact resistance and which contains more than 40 percent by weight of polymerized units of styrene.

A double-layer assembly of a styrene polymer and polyphenylene oxide shows, for example, excellent mar resistance on the polyphenylene oxide side and good heat-sealability on the styrene polymer side.

A three-layer assembly consisting of a styrene polymer sandwiched between polyphenylene oxide layers is stiff and tenacious, is resistant to and sterilizable by boiling water over long periods and shows considerably reduced flammability compared with pure styrene polymer. Its liability to enviromental stress cracking is less than that of the pure styrene polymer.

A sandwich assembly of polyphenylene oxide between two styrene polymer layers is readily heat-sealable and stiff.

The long-term thermal stability as measured by German Standard Specification DIN 53,446 is excellent. It is higher than that of either of the starting materials, i.e. pure polyphenylene oxide and pure styrene polymer, because the oxidizability and light-sensitivity of polyphenylene oxide are reduced and the dimensional stability of the styrene polymer is improved by the presence of the polyphenylene oxide.

The styrene polymer used may be homopolystyrene or it may be a copolymer containing up to 60 percent by weight of comonomer, for example acrylonitrile, acrylates, methacrylates, maleic anhydride or α-methylstyrene. In the case of acrylonitrile the preferred emount of comonomer contained in the copolymer is between 5 and 25 percent by weight, in the case of acrylates it is between 5 and 30 percent by weight, in the case of maleic anhydride it is between 5 and 40 percent by weight and in the case of α-methylstyrene it is between 10 and 50 percent by weight. Styrene polymers which have been modified to improve their impact resistance may also be used, for example those prepared by polymerizing styrene, optionally together with comonomers, in the presence of an elastifier rubber or by blending styrene homopolymers or copolymers with rubbers which may or may not be grafted. Preferred rubbers are butadiene homo- and co-polymers, block copolymers of butadiene and styrene and acrylate polymers. They may be contained in the styrene polymer in quantities ranging from 3 to 30 percent by weight. Preferably the layer B is composed of impact-resistant polystyrene which contains from 2 to 10 percent by weight of polybutadiene.

Polyphenylene oxide may be prepared by oxidizing 2,6-dimethylphenol in air. Instead of pure polyphenylene oxide, layer A of the laminates of the invention may consist of a blend of polyphenylene oxide with up to 80 percent and preferably from 20 to 50 percent by weight of other plastics materials compatible therewith, for example impact resistant polystyrene.

The synthetic thermoplastic materials used in the separate layers may contain conventional additives such as filters, lubricants, pigments and stabilizers. The laminates may comprise, in addition to styrene polymers and polyphenylene oxide, layers of other materials or carriers such as woven or nonwoven fabrics, netting, metal sheeting or the like.

The laminates of the invention may be manufactured in a variety of ways:
they are preferably made by co-extruding the components through separate nozzles at barrel temperatures of from about 170° to 350°C. The dies may be slot dies, of which at least two must be provided in parallel relationship to each other, or they may be annular dies having at least two concentric circular die slots. The molten layers may be united either within the slot die or annular die assembly or shortly after the films have left the die. Appropriate multiple-die arrangements are well known.

The layers, while still plastic, may be pressed together by conventional methods, e.g. by means of rollers where sheet dies are used or by means of compressed air where annular dies are used. The thickness of the individual layers may be varied by adjusting the rate of extrusion.

The thickness of the laminates is mainly governed by their application. In the case of sheets and panels, the total thickness generally used is from 0.1 to 20 mm.

Another way of making the laminates is to take finished structures of polyphenylene oxide, for example sheets thereof, and coat or spray them with a solution or melt of the styrene polymer. Where a solution is used, the solvent must be subsequently evaporated off. Melt coating may be effected, for example, by extruding a melt onto the substrate by means of an extruder or by injection molding the styrene polymer into a mold in which a sheet of polyphenylene oxide has been placed. Such injection molding may be effected in two or more stages, a different injection molding die being used in each case if it is desired that the individual layers differ from each other.

The laminates may also be produced by pressing preformed sheets of the individual components together and heating them for a short time to temperatures of from about 130° to 280°C.

EXAMPLE 1

A 0.7 mm thick sheet of an impact-resistant polystyrene containing 8 percent by weight of polybutadiene was placed on a 0.3 mm thick sheet of polyphenylene oxide, and the two sheets were heated for 4 minutes in a press at 250°C and were then pressed together under an applied pressure of 25 kg/cm² for 5 minutes. The resulting panel is resistant to boiling water and the individual layers cannot be separated. The panel was subjected to deep-drawing at 200°C to produce beakers which retained their shape when exposed to temperatures of about 165°C for a period of 30 minutes.

EXAMPLE 2

A 0.1 mm thick sheet composed of a mixture of 50 percent by weight of polyphenylene oxide and 50 percent by weight of an impact-resistant polystyrene containing 6 percent by weight of polybutadiene was sandwiched between two 0.95 mm thick sheets of the same impact-resistant polystyrene containing 6 percent by weight of polybutadiene. Beakers which had been deep-drawn from the resulting panel at 200°C retained their shape when subjected to heat-treatment at up to about 140°C for 30 minutes.

We claim:

1. A laminate consisting of at least one layer A and one layer B, wherein layer A contains more than 20 percent by weight of a polyphenylene oxide of the general formula:

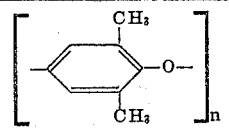

where $n$ is from approximately $10^8$ to about $10^4$, and layer B constitutes an impact-resistant styrene polymer which contains more than 40 percent by weight of polymerized units of styrene.

2. A laminate as claimed in claim 1, wherein layer A consists of a mixture of polyphenylene oxide and from 20 to 50 percent by weight of impact-resistant polystyrene.

3. A laminate as claimed in claim 1, wherein said styrene polymer of layer B consists of a copolymer of polystyrene and from 2 to 10 percent by weight of polybutadiene.

4. A laminate as claimed in claim 1 having a thickness of from 0.1 to 20 mm.

5. A laminate as claimed in claim 1 wherein a layer B is sandwiched between two layers A.

* * * * *

UNITED STATES PATENT OFFICE
CERTIFICATE OF CORRECTION

Patent No. 3,781,186  Dated December 25, 1973

Inventor(s) Karl Stange, Helmut Jenne & Ulrich Koenig

It is certified that error appears in the above-identified patent and that said Letters Patent are hereby corrected as shown below:

First page, left-hand column, eleventh line, insert
-- [30] Foreign Application Priority Data
    April 5, 1971          Germany . . . P 21 16 558.2 --.

Column 2, line 30, "emount" should read -- amount --

Column 2, line 58, "filters" should read -- fillers --.

Signed and sealed this 15th day of October 1974.

(SEAL)
Attest:

McCOY M. GIBSON JR.           C. MARSHALL DANN
Attesting Officer             Commissioner of Patents